United States Patent
Galloway et al.

(10) Patent No.: US 6,675,235 B1
(45) Date of Patent: Jan. 6, 2004

(54) METHOD FOR AN EXECUTION UNIT INTERFACE PROTOCOL AND APPARATUS THEREFOR

(75) Inventors: Frank C. Galloway, Dripping Springs, TX (US); Kristen L. Mason, Austin, TX (US); Gary R. Morrison, Austin, TX (US); Charles Edward Nuckolls, Austin, TX (US); Jennifer L. McKeown, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/488,363

(22) Filed: Jan. 18, 2000

Related U.S. Application Data (63) Continuation-in-part of application No. 09/426,009, filed on Oct. 25, 1999, now Pat. No. 6,421,744.

(51) Int. Cl.[7] .............................................. G06F 13/14
(52) U.S. Cl. ........................ 710/29; 712/209; 712/210; 364/200
(58) Field of Search ............................ 710/29; 712/210, 712/209; 364/200

(56) References Cited

U.S. PATENT DOCUMENTS

| | | | | |
|---|---|---|---|---|
| 4,240,139 A | * | 12/1980 | Fukuda et al. ................ | 364/20 |
| 5,596,760 A | * | 1/1997 | Ueda ........................... | 395/700 |
| 5,692,207 A | * | 11/1997 | Ho-Lung et al. ........... | 395/800 |
| 5,860,130 A | * | 1/1999 | Yamanaka et al. .......... | 711/169 |
| 6,105,126 A | * | 8/2000 | Check et al. ................ | 712/210 |
| 6,223,275 B1 | * | 4/2001 | Goto et al. .................. | 712/200 |
| 6,339,820 B1 | * | 1/2002 | Baentsch et al. ........... | 712/209 |
| 6,370,623 B1 | * | 4/2002 | Mehra et al. ................ | 711/149 |

OTHER PUBLICATIONS

Motorola M68020 Microprocessors User's Manual, Section 7, "Coprocessor Interface Description", pp. 7–1–7–60.

* cited by examiner

Primary Examiner—Abdelmoniem Elamin
(74) Attorney, Agent, or Firm—James L. Clingan, Jr.

(57) ABSTRACT

An execution unit (2) interface protocol allowing flow-through of data, where a function is specified once and the execution unit performs the function for multiple sets of input data. Function execution is pipelined through the execution unit, where an input unit (6) stores information, while a function logic unit (4) processes data and an output unit (8) holds results to be output. The execution unit (2) allows for data rate distortion, in applications such as data compression, where the amount of data received is different from the amount of data generated as output.

12 Claims, 6 Drawing Sheets

METHOD FOR AN EXECUTION UNIT INTERFACE PROTOCOL AND APPARATUS THEREFOR

RELATED APPLICATIONS

This is a continuation-in-part (CIP) of U.S. Patent Application by Gary Morrison, et al., Ser. No. 09/426,009 filed on Oct. 25, 1999 now U.S. Pat. No. 6,421,744 and assigned to the assignee hereof.

This application is related to patent application Ser. No. 09/488,366 now U.S. Pat. No. 6,581,086 entitled "MULTIPLY AND ACCUMULATE UNIT (MAC) AND METHOD THEREFOR" by Gary Morrison, et al., filed concurrently herewith and assigned to the assignee hereof.

FIELD OF THE INVENTION

The present invention relates to an execution unit in a data processing system, and specifically to an execution unit used in a direct memory access controller.

BACKGROUND OF THE INVENTION

As data processing systems are required to process increasing amounts of information and perform a variety of operations on data, coprocessors are often added to perform specific functions. In video and audio applications the data is compressed and/or decompressed to improve the throughput of the transmission system. These systems require arithmetic and logical operation capability as well as more complex operations to accommodate compression, etc. Typically, these functions are performed using software or some dedicated hardware.

Many of the more complicated operations result in data rate distortion. For example, when input data is compressed, the amount of output data that will result from a given input data stream is often not determinable. Data rate distortion adds to the flexibility of the data processing system and is a requirement of most systems that process video, audio and communication information.

Software routines provide a flexible, convenient method of processing information, but also introduce latency into the systems, as typically many cycles are required to perform each of the various algorithms. Hardware solutions are less flexible, but provide a faster computation. Hardware and coprocessors typically have an input/output (I/O) bus for communication with the main processor, such as a central processing unit (CPU), and the rest of the data processing system. The I/O bus prevents the coprocessor from simultaneously receiving data while outputting data to the data processing system. This prevents these coprocessors from pipelining instructions where instructions are received while others are processed.

Therefore, there is a need within a data processing system for an interface protocol that allows for complex processing of information involving data rate distortion, for applications such as compression and decompression, and that allows continuous pipelined flow of data through an execution unit to improve processing speed.

BRIEF DESCRIPTION OF THE DRAWINGS

The present invention may be more fully understood by a description of certain preferred embodiments in conjunction with the attached drawings in which.

DETAILED DESCRIPTION OF THE PREFERRED EMBODIMENTS

The present invention provides a method of processing data through an execution unit using an interface protocol allowing flow-through of data, where a function is specified once and the execution unit performs the function for multiple sets of input data. Function execution is pipelined through the execution unit. The execution unit allows for data rate distortion, in applications such as data compression, where the amount of data received is different from the amount of data generated as output.

In one aspect of the present invention, in a data processing system having a processor and an execution unit, a method for executing an assigned operation, includes the steps of assigning an operation code to the execution unit, the operation code corresponding to the assigned operation; and invoking the assigned operation for a plurality of (address specifier sets) input data sets.

In another aspect of the present invention, in a data processing system having a processor, a memory coupled to the processor and an execution unit, a method for moving data includes the steps of assigning an operation code to the execution unit, the operation code corresponding to an assigned operation; loading input data sets into the execution unit from a first memory location; performing the assigned operation on the input data sets; sampling an operation done signal; and retrieving a number of output data sets from the execution unit based on the operation done signal for storing to a second memory location (or as input to another EU) wherein the operation done signal provides for a non-deterministic number of output data sets from the input data sets.

The present invention will be described with respect to the Figures. For clarity the terms assertion and negation are used herein to avoid confusion regarding "active-low" and "active-high" signals. The term assert or assertion is used to indicate that a signal is active or true, independent of whether that level is represented by a high or a low voltage. The term negate or negation is used to indicate that a signal is inactive or false.

Figure 1:
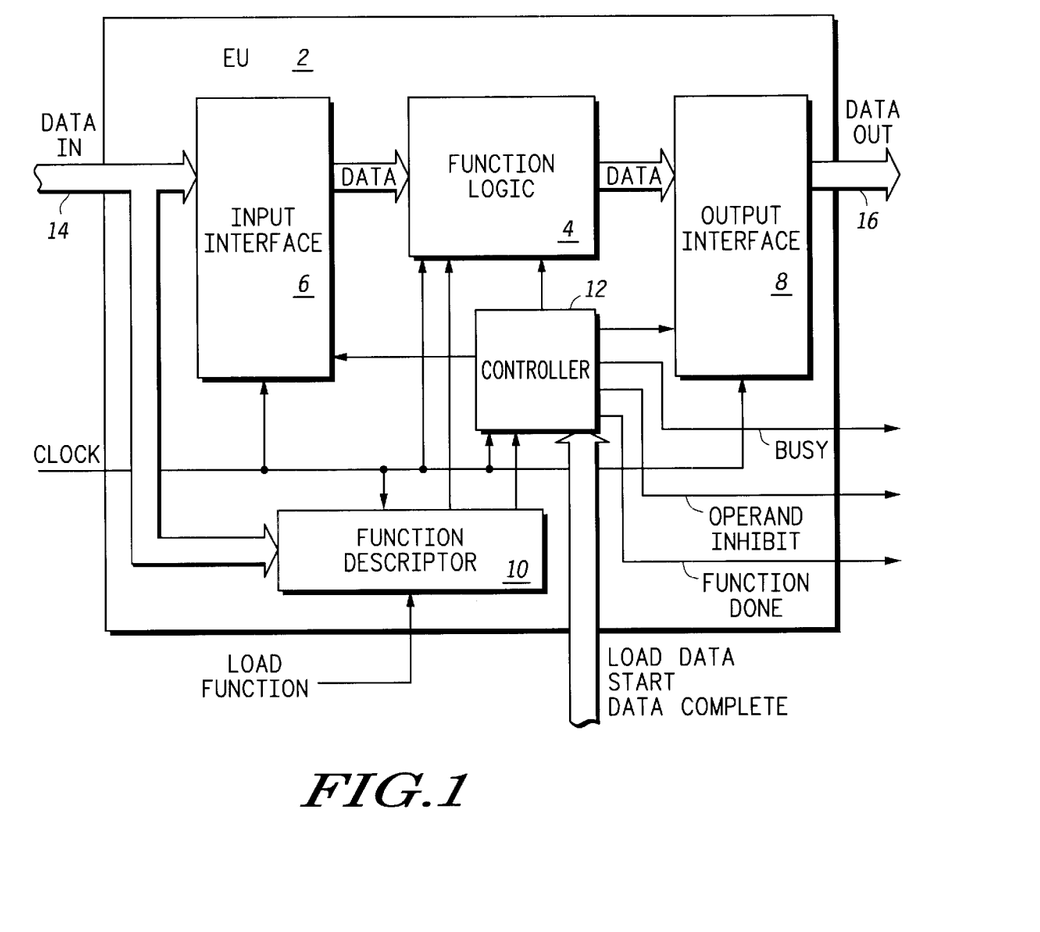
FIG. 1 illustrate, in block diagram form, an execution unit according to one embodiment of the present invention.

FIG. 1 illustrates an execution unit 2 in accordance with one embodiment of the present invention. The execution unit 2 includes function logic 4, input interface 6, output interface 8, function descriptor 10 and a controller 12. A clock signal is provided to the input interface 6, the function logic 4, the output interface 8, the function descriptor 10, and the controller 12. Data in is provided via Data In Bus 14, where data information is provided to the input interface 6 from external to the execution unit 2. The data information is digital information and may include but not be limited to audio or video information provided in a data stream, characters in a data file to be compressed, data from a mass storage device, etc. The input interface 6 and the function descriptor 10 receive the data information, and the input interface 6 provides the data to the function logic 4 according to control signals generated by the controller 12.

The function logic 4 output is provided to the output interface 8 which then outputs the data information on Data Out Bus 16. The output interface 8 holds the data received from the function logic 4 until it is ready to be sampled external to the execution unit 2.

The function logic 4 may be any functional unit that processes data, including but not limited to an arithmetic unit, a logical unit, a multiply/accumulate (MAC) unit, a compression/decompression engine, a cyclic redundancy check (CRC) engine, etc. The particular function of the function logic 4, i.e. the way the function logic 4 processes data, is specified by the function descriptor. The controller 12 is coupled to the function logic 4, the input interface 6, and the output interface 8 to provide control signals and information for processing data. The controller 12 receives function information from the function descriptor 10, where the function information indicates the function to be performed by the execution unit 2. In one embodiment, the function descriptor 10 is a register storing the function descriptor. The function descriptor 10 receives a load function signal. In an alternate embodiment, the function descriptor 10 is a selection mechanism for selecting from a set of predefined function descriptors.

The controller 12 also receives several control signals from external to the execution unit 2, including but not limited to a load data signal, a start signal, and a data complete signal. The load data signal indicates that data is ready to be input into the execution unit 2. The start signal indicates that the execution unit 2 has received the data required to perform a function. In response to the start signal, the function logic 4 performs the designated function on the portion of data. In some situations the function logic 4 doesn't wait for the start signal to begin processing data, such as where the function logic 4 is accumulating an undetermined amount of data and the function logic 4 begins accumulating without respect to the start signal for each portion of data. Note that a portion may be one datum or some integral unit of data.

Basically, the start signal indicates that the function logic 4 has received sufficient data to perform the designated function. The data complete signal indicates that a block of data is complete, where a stream of data is provided to the function logic 4 and the function logic 4 performs the designated function on portions of the block of data. An example of a block of data is a stream of data for compression, where the designated function is to compress data. The data complete signal is asserted when the block of data is finished.

The controller 12 may be a state machine or other controller circuitry for controlling the operation of the execution unit 2. In response to the control signal(s) and the function descriptor information, the controller 12 generates control signal(s) to the input interface 6 to provide data to the function logic 4. Similarly, the controller 12 provides control information to the function logic 4 to set up and initiate the designated function. When the result is ready to be output, the controller 12 generates control signal(s) to the output interface 8 indicating that data is to be output.

During processing, the controller 12 outputs a busy signal indicating that the execution unit 2 is currently executing. The controller 12 outputs a function done signal indicating that the designated function has completed. For example, where the function designated by the function descriptor 10 is an AND function, the function done signal is asserted when the AND has received its inputs, ANDed them together and is ready to provide the result. The controller 12 similarly generates an operand inhibit signal indicating that the function logic 4 is still processing information and the execution unit 2 is not ready to receive new inputs.

The execution unit 2 illustrated in FIG. 1 allows for data flow-through where the desired function is specified by initially designating the function of the function logic 4, and data then flows through the execution unit 2 and is processed according to the designated function. The function of the execution unit 2 only changes when a new function is loaded into the function descriptor 10. The present invention allows for the data flow-through without requiring the specification of a function for each new data or datum.

The present invention further allows for pipelining of function execution, where data is received while previous data is still processing. As illustrated in FIG. 1, data may be input into the input interface 6 while previous data is processing in the function logic 4, and the result of even earlier processed data is waiting in the output interface 8 to be output.

The present invention allows for data rate distortion, in applications such as data compression, where the amount of data received is different from the amount of data generated as output. In data rate distortion, the amount of distortion may be undetermined prior to operation of the execution unit 2, such as in data compression, where the amount of data output is determined by the function of the execution unit 2 and the data it operates on, and not on the execution unit 2 protocol. In this case the data rate distortion is data-sensitive.

The present invention, as illustrated in FIG. 1, provides a dichotomy of address and data information, where the data processing system external to the execution unit 2 operates on address information without regard to the specific data associated with that address information, and the execution unit 2 operates on the data information without regard to the address information.

In an alternate embodiment, load function may provide a function number, where functions are each assigned a predetermined code, and the function number is that code. The function number then indicates the designated function for the function logic 4. In this case the function descriptors are preloaded internally within the execution unit 2, and the function is identified by the function number and without the need to load the function descriptor in the function descriptor 10. The execution unit 2 outputs a function internal signal indicating whether the functions are stored internally and may be accessed by the function number or whether the function must be loaded.

Additionally, in one embodiment a load constant signal is input into the execution unit 2 to identify a constant input, in which case the data flow-though execution unit 2 has a fixed input. As an example, such as a multiplier used in an amplifying application. In this case, the data is multiplied, but one multiplicand is a constant and the data is applied as the other multiplicand. This saves operation time as the execution unit 2 does not have to reload the constant value with every data set.

In another embodiment, the execution unit 2 examines the operands presented and if there is an error detected, such as insufficient data or data of a different form, generates a function fail signal instead of the function done signal.

Figure 2:
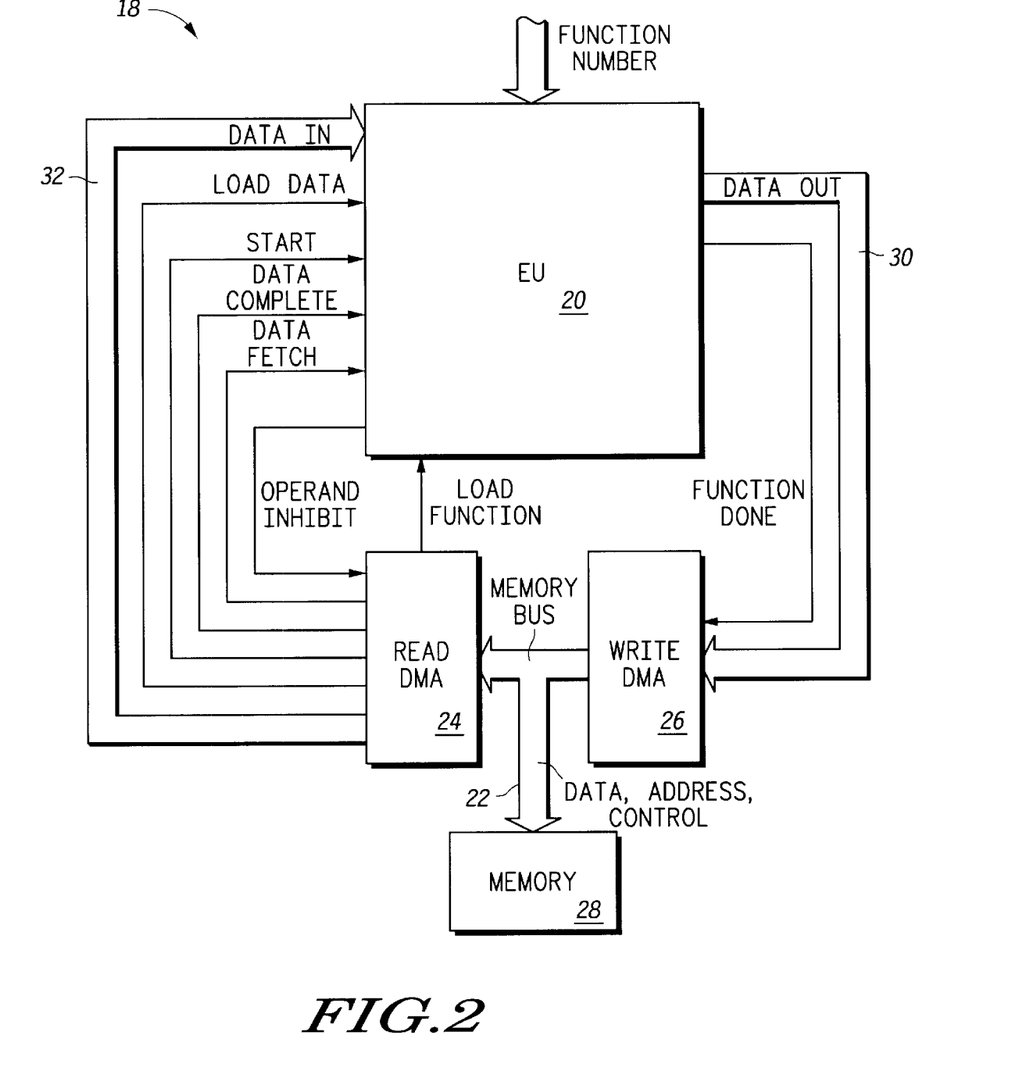
FIG. 2 illustrates, in block diagram form, a data processing system having an execution unit as in FIG. 1 in accordance with one embodiment of the present invention

FIG. 2 illustrates a data processing system 18 according to one embodiment of the present invention. An execution unit 20 similar to execution unit 2 of FIG. 1 performs a plurality of functions. Within the data processing system 18, memory bus 22 is coupled to a read DMAC 24, a write DMAC 26, and a memory 28. Address, data, and control information are communicated within the data processing system 18 via the memory bus 22.

Data is provided as output from the execution unit 20 to the write DMAC 26 via Data Out Bus 30. Data is provided as input from the read DMAC 24 to the execution unit 20 via Data In Bus 32. A function number is provided to the execution unit 20 to designate a function for operation. The function number may be generated by a processor or by the read DMAC 24. The data processing system 18 operates according to the timing scenarios illustrated in FIGS. 3–6. The load function signal is generated by the read DMAC 24. The function done signal is provided by the execution unit 20 to the write DMAC 26. The operand inhibit signal is generated by the execution unit 20 to the read DMAC 24. The start, data complete, and load data signals are provided by the read DMAC 24.

FIGS. 3–6 illustrate various timing scenarios associated with the operation of the execution unit 2 according to the present invention. The signals indicated in the timing diagrams are located within data processing system 18 of FIG. 2. In each of these illustrations, the horizontal axis represents time and the vertical axis represents various signals used and/or generated by the execution unit 2. A clock signal is provided and odd cycles are indicated at the top of each figure. The load data signal and data fetch signals are active low signals; all the other signals are active high signals.

Figure 3:
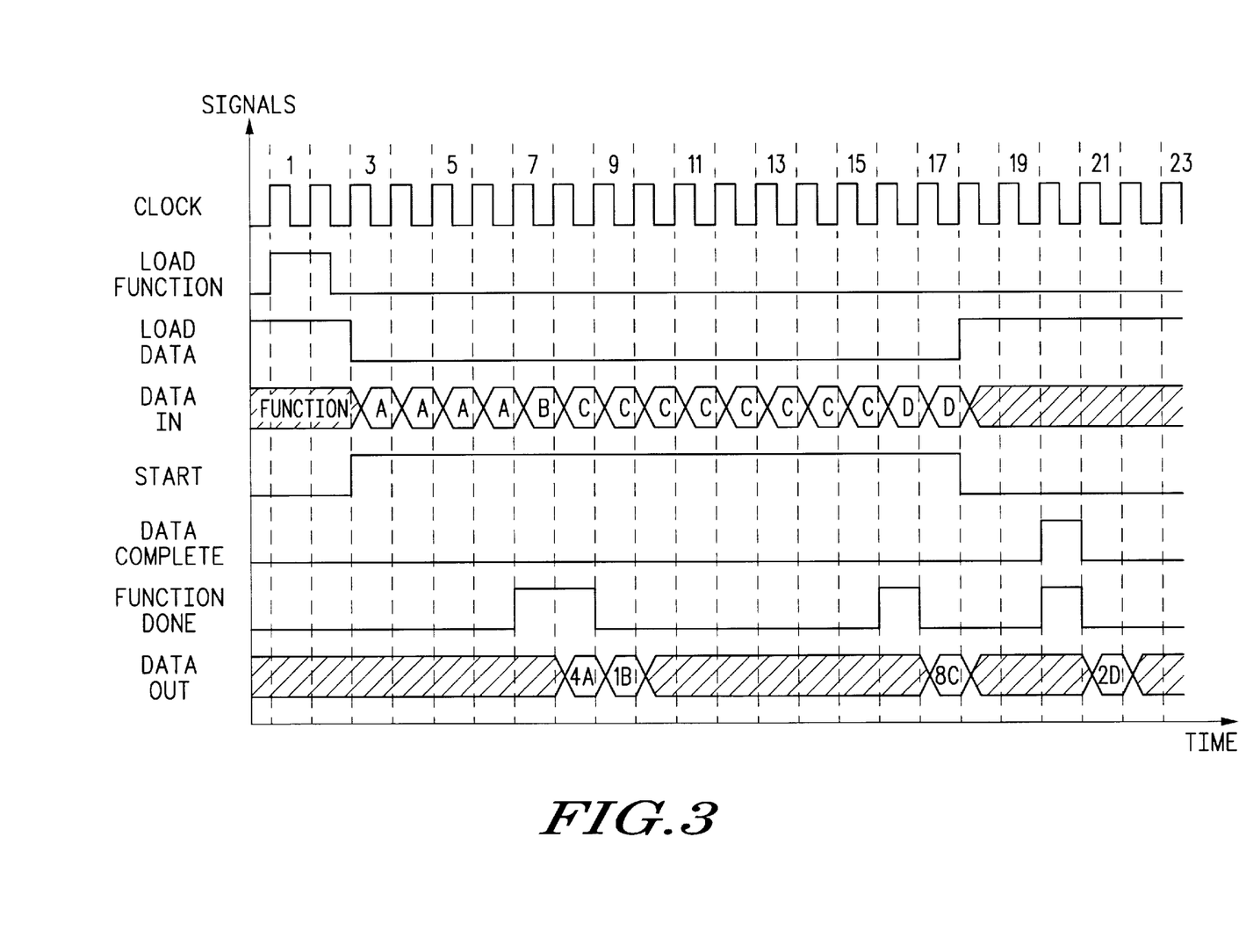
FIGS. 3–6 illustrate, in timing diagram form, operation of an execution unit as in FIG. 1.

FIG. 3 illustrates an example of data compression using the execution unit 2, where 4 bit data values are received and 8 bit data values are output. The upper 4 bits of the output represent the number of times one 4 bit data value is received successively. The lower 4 bits of the output represent the data value. The load function signal is asserted prior to the rising edge of the clock signal on cycle 2. While the load function signal is asserted the Data In provides the function descriptor of the next function. The function descriptor is loaded into the function descriptor 10. Note that in this example, the data values, A, B, C and D, are hexadecimal values.

The load data signal is asserted before the rising edge of the clock on cycle 4 indicating that data is valid. Simultaneously the start signal asserts and the first piece of data "A" is valid during cycle 3. The load data signal stays asserted and data will continue to be valid until the load data signal is negated. Here successive data values are valid, one per clock cycle. The data for the designated function is input continuously and therefore the start signal remains asserted. At cycle 7 the execution unit 2 notices that the data has changed from "A" to "B" and in response the execution unit 2 asserts the function done signal. In the following clock cycle, the execution unit 2 drives the value "4A" as output on cycle 8, where the "A" identifies the data value and the "4" identifies the number of successive occurrences.

At cycle 8 the execution unit 2 notices that the data has changed from "B" to "C" and in response continues to assert the function done signal. On cycle 9 the execution unit 2 outputs a "1B" indicating one occurrence of the data value "B." Once the data changes to "C" the function done is negated on cycle 9. The function done signal precedes valid data. Data values of "C" are tallied until cycle 16 when the data value changes to "D." In response to the change, the function done is asserted and the tallied result output. This process continues until the last datum is input into the execution unit 2, as illustrated at cycle 18. At this point, the load data signal negates, and the start signal negates indicating the end of the data stream. On cycle 20 the data complete asserts indicating the execution unit 2 is to output any accumulated information that has not been output. At this point the execution unit 2 outputs "2D" on cycle 21.

Figure 4:
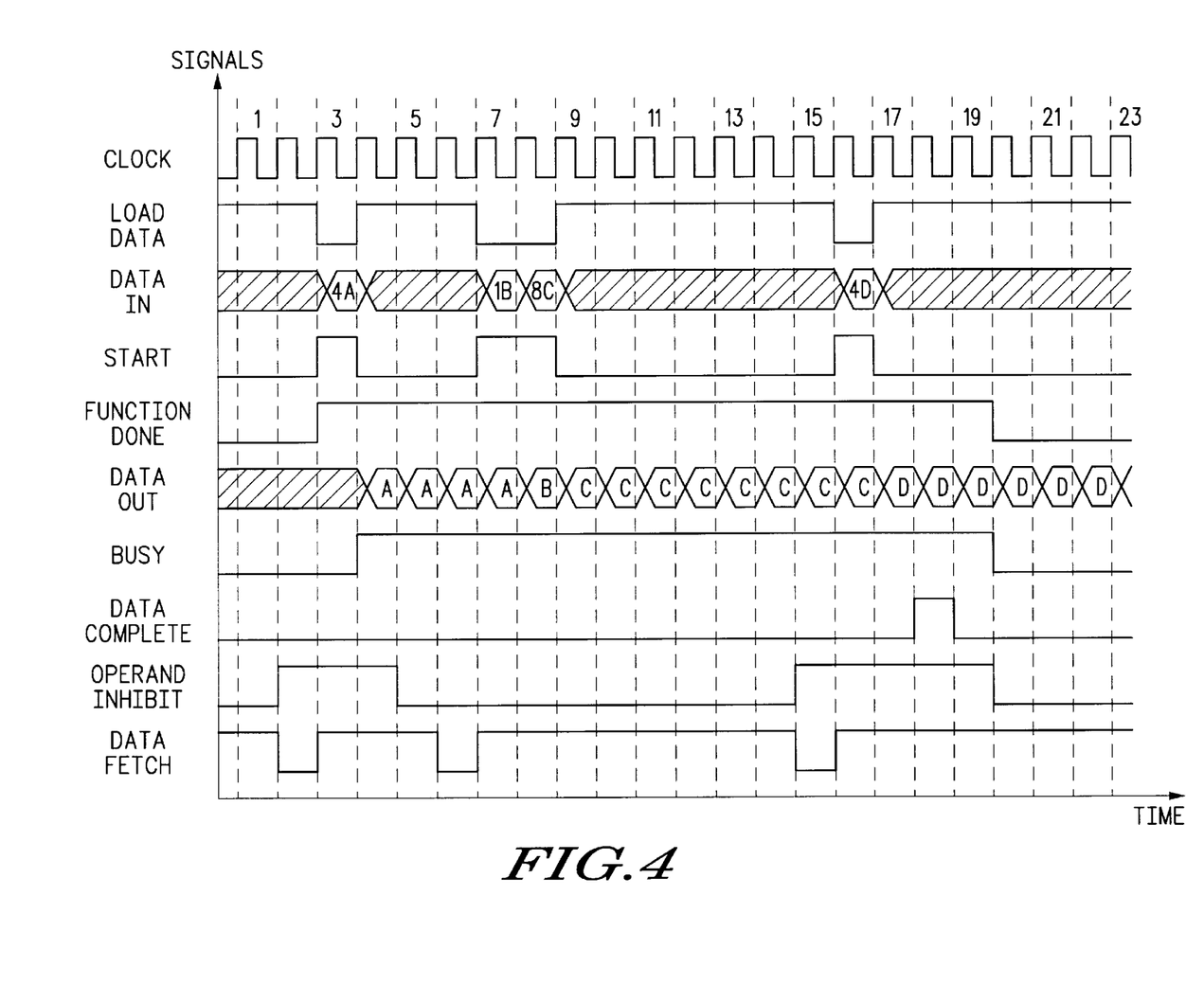
Figure 5:
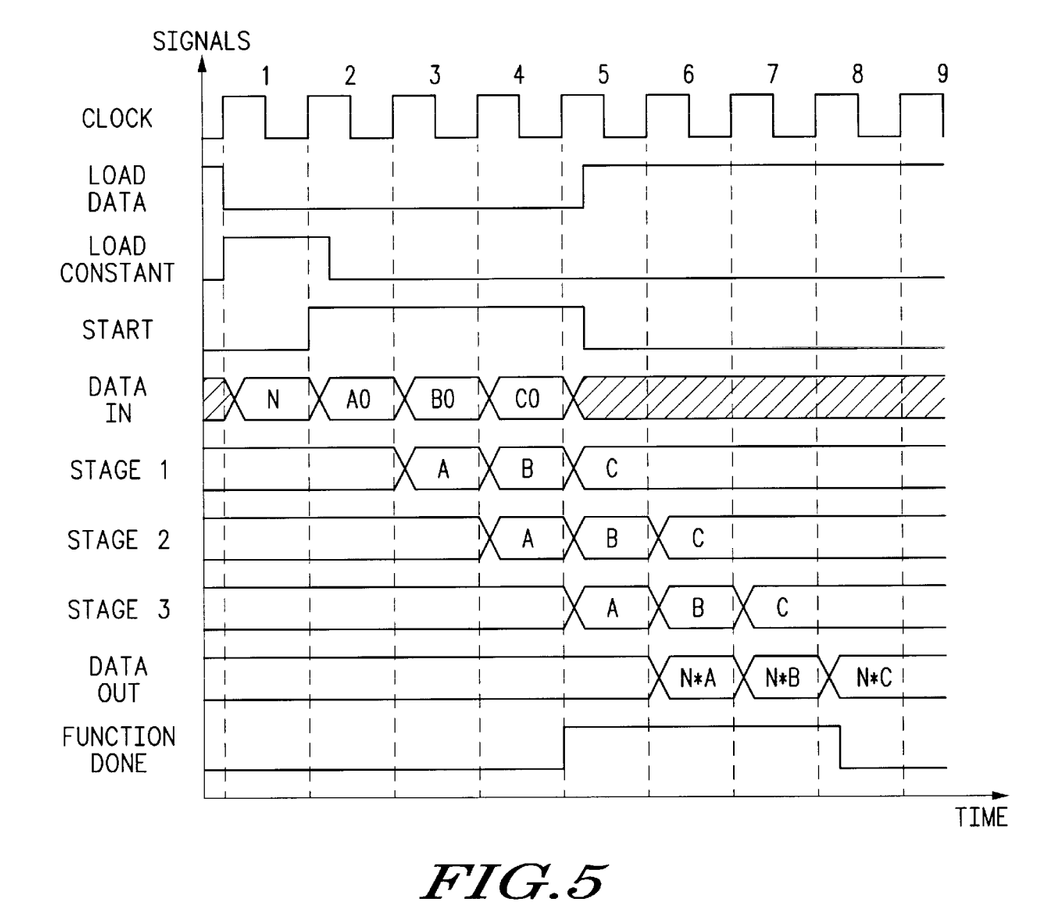

In FIG. 4, a decompression function is illustrated. The decompression function is opposite to the compression function, where the data input is the compressed value and the data output is the uncompressed data. As illustrated in FIG. 4, the first Data In is "4A" and the corresponding output is "AAAA." As illustrated, the data complete signal is asserted between clocks 17 and 19, indicating that the last Data In "4D" completes the data for this function. The execution unit 2 asserts an operand inhibit signal between clocks 2 and 4 to indicate that it can receive no further data, as in cases where the pipeline is full. Similarly, the execution unit 2 asserts the operand inhibit signal again between clocks 15 and 19. Note that the operand inhibit signal may indicate that the pipeline is full and therefore the execution unit is not ready to receive more data, and also may indicate that the execution unit has no more data to output. Also illustrated in FIG. 4 is a busy signal output from the execution unit 2 indicating that the execution unit 2 is busy as it currently executing. The execution unit 2 asserts the busy signal FIG. 5 illustrates operation of the execution unit 2 of FIG. 1 where a multiply accumulate (MAC) function is designated for the function logic 4. FIG. 4 provides an exemplar of the pipelining of operations according to the present invention. The load data signal is asserted during clock cycle 1. In this case the data A0, B0, and C0 are multiplied by a constant value, N, so the load constant signal is asserted during clock cycle 1. The constant N is provided as Data In during the first clock cycle. During clock cycles 2, 3, and 4, the data A0, B0, and C0 are input, respectively. The multiplication process takes four (4) clocks to complete, where each stage performs successive steps in the process. Stage 1 of the function logic 4 processes A0 data during clock cycle 3 and stage 2 processes A0 data during clock cycle 4. Stage 1 processes B0 data during clock cycle 4 and processes C0 data at clock cycle 5. Stage 2 processes B0 data during clock cycle 5 and processes C0 data during clock cycle 6.

Note that concurrently with stage 2 processing of A0 data, stage 1 is processing B0 data. Similarly, with stage 2 processing of B0 data, stage 1 is processing C0 data. The data is output on successive clock cycles 6, 7 and 8 for each result A, B and C, respectively. In this way the execution unit 2 does not need to wait for all stages of operation to complete before receiving new data. The execution unit 2 of the present invention allows pipelining of functions reducing the time required to process multiple data. The function done signal is asserted during cycle 5 initiating the output of Data In the following clock cycles 6, 7 and 8.

Figure 6:
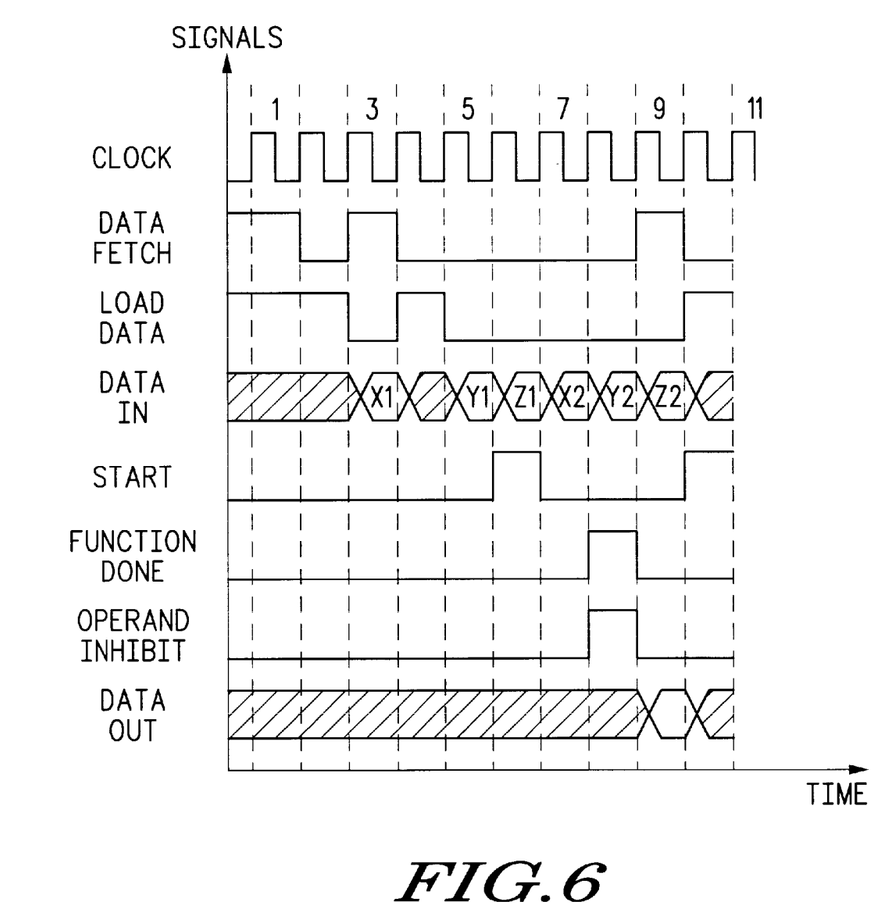

FIG. 6 illustrates data rate distortion using the execution unit 2. A data fetch signal indicates the initiation of a data fetch, and a load data signal indicates the data is ready as input. The data fetch signal and the load data signal are both active low signals. Assertion of the data fetch signal in clock cycle 2 begins the operand transfer. The load data is asserted in clock cycle 3 and data is valid during cycle 3. The data fetch is asserted in clock cycles 4 through 8. The load data signal is asserted cycles 5 through 9. Data is valid for cycles 5 through 9.

In this case it is possible to prevent a new read access by asserting an operand inhibit signal before the data fetch signal is asserted for that access. The function code indicates the function of the execution unit 2. The function descriptor therefore indicates the number of operands expected for this function. The operand inhibit signal prevents further data fetches after the data fetch of the final operand for this iteration of the function. The operand inhibit acts as a hold on that function to prevent further data fetches. In one embodiment, the operand inhibit must be asserted with the data fetch of the final operand.

As illustrated in FIG. 6, the operand inhibit signal is asserted in clock cycle 8, during the fetch of the final operand, "Z2." Assertion of the operand inhibit signal forces the data fetch of cycle 9 to negate. The data fetch signal asserts at clock 10. While the operand inhibit signal is asserted the execution unit 2 is prevented from receiving further data.

The present invention provides a data processing system for an interface protocol that allows for complex processing of information involving data rate distortion, for applications such as compression and decompression, and that allows continuous pipelined flow of data through an execution unit to improve processing speed. An execution unit interface protocol allows flow-through of data, where a function is specified once and the execution unit performs the function for multiple sets of input data. Function execution is pipelined through the execution unit, where an input unit stores information, while a function logic unit processes data and an output unit holds results to be output. The execution unit thus allows for data rate distortion, as used in applications such as data compression, where the amount of data received is different from the amount of data generated as output.

Those skilled in the art will recognize that modifications and variations can be made without departing from the spirit of the invention. Therefore, it is intended that this invention encompass all such variations and modifications as fall within the scope of the appended claims.

What is claimed is:

1. In a data processing system having a processor and an execution unit, a method for executing an assigned operation, comprising:

assigning an operation code to the execution unit, the operation code corresponding to the assigned operation; and invoking the assigned operation for a plurality of input data sets, wherein the step of invoking the assigned operation includes asserting a start signal for each input data set of the plurality of input data sets;

loading a first input data set of the plurality of input data sets into the execution unit; and performing the assigned operation on the first input data set while loading a second input data set of the plurality of input data sets for performance of said assigned operation code.

2. In a data processing system having a processor, a memory coupled to the processor and an execution unit, a method for performing an operation on data comprising:

assigning an operation code to the execution unit, the operation code corresponding to an assigned operation;

loading input data sets into the execution unit;

performing the assigned operation on the input data sets;

sampling an operation done signal; and retrieving a number of output data sets from the execution unit based on the operation done signal, wherein the operation done signal provides for a non-deterministic number of output data sets from the input data sets.

3. The method as in claim 2, wherein the step of performing the assigned operation on the input data sets further comprises;

performing the assigned operation on a first input data set while loading a second input data set.

4. The method as in claim 2, wherein the step of sampling an operation done signal further comprises:

deriving the operation done signal from the operation code.

5. The method as in claim 2, wherein the step of sampling an operation done signal further comprises:

deriving the operation done signal from the operation code and the input data sets.

6. The method as in claim 2, wherein the step of sampling an operation done signal further comprises:

deriving the operation done signal from a combination of the operation code, an asserted start signal, and a load data signal.

7. The method as in claim 2, wherein the number of input data sets is non-deterministic.

8. The method as in claim 7, wherein the assigned operation is a data compression.

9. A data processing system comprising:

a processor for assigning an operation code to an execution unit, the operation code corresponding to an assigned operation;

a memory coupled to the processor;

a read engine for loading input data sets into the execution unit from a first memory location, wherein the execution unit performs the assigned operation on the input data sets;

a write engine for sampling an operation done signal and for receiving a number of output data sets from the execution unit based on the operation done signal for storing to a second memory location; and wherein the operation done signal provides for a non-deterministic number of output data sets from the input data sets.

10. The data processing system of claim 7, wherein the operation done signal is derived from the operation code.

11. The data processing system of claim 7, wherein the operation done signal is derived from the operation code and the input data sets.

12. The data processing system of claim 7, wherein the operation done signal is derived from a combination of the operation code, an asserted start signal, and a load data signal.

* * * * *